(12) United States Patent
Su et al.

(10) Patent No.: US 6,969,562 B2
(45) Date of Patent: Nov. 29, 2005

(54) FUEL CELL POWER GENERATION METHOD AND SYSTEM

(75) Inventors: Qingquan Su, Tokyo (JP); Kazuo Kinoshita, Tokyo (JP); Yasuo Tanaka, Tokyo (JP); Tomohiro Togo, Tokyo (JP)

(73) Assignee: Ebara Corporation, Tokyo (JP)

( * ) Notice: Subject to any disclaimer, the term of this patent is extended or adjusted under 35 U.S.C. 154(b) by 369 days.

(21) Appl. No.: 10/220,471

(22) PCT Filed: Mar. 2, 2001

(86) PCT No.: PCT/JP01/01633

§ 371 (c)(1),
(2), (4) Date: Nov. 29, 2002

(87) PCT Pub. No.: WO01/65621

PCT Pub. Date: Sep. 7, 2001

(65) Prior Publication Data

US 2004/0023086 A1     Feb. 5, 2004

(30) Foreign Application Priority Data

Mar. 2, 2000   (JP)   ............................. 2000-057730

(51) Int. Cl.[7] .............................. H01M 8/06; C01B 3/26
(52) U.S. Cl. ..................... 429/17; 423/648.1; 423/652; 423/655; 429/19; 429/20
(58) Field of Search .......................... 423/220, 648.1, 423/652, 655; 429/17, 19, 20

(56) References Cited

FOREIGN PATENT DOCUMENTS

| JP | 07000996 A | * | 1/1995 | ........... C02F 11/04 |
|---|---|---|---|---|
| JP | 7-118669 | | 5/1995 | |
| JP | 7-996 | | 6/1995 | |
| JP | 9-29295 | | 2/1997 | |
| JP | 11126629 A | * | 5/1999 | ........... H01M 8/04 |
| JP | 2000-294266 | | 10/2000 | |
| WO | 97 18885 | | 5/1997 | |
| WO | 01/04046 | | 1/2001 | |

OTHER PUBLICATIONS

Naumann, S.T., et al., "*Fuel Processing of Biogas for Small Fuel Cell Power Plants*", Journal of Power Sources, Ch, Elsevier Sequoia S.A. Lausanne, vol. 56, No. 1, Jul. 1, 1995, pp. 45-49.

(Continued)

*Primary Examiner*—Stanley S. Silverman
*Assistant Examiner*—Maribel Medina
(74) *Attorney, Agent, or Firm*—Wenderoth, Lind & Ponack, L.L.P.

(57) ABSTRACT

A hydrogen-containing gas suitable for use in a fuel cell, especially in a proton exchange membrane fuel cell, is produced from a digestion gas (b) yielded in methane fermentation of organic matter (a), and is then supplied to the fuel cell to generate electricity. A fuel cell power generation method comprises a methane fermentation step (A) for subjecting organic matter to methane fermentation, a pretreatment step (B) for pretreating digestion gas yielded in the methane fermentation step, a hydrogen production step (C) for producing hydrogen-containing gas (c) from the gas which has been pretreated in the pretreatment step, and a fuel cell power generation step (D) for supplying the hydrogen-containing gas produced in the hydrogen production step to a fuel cell to generate electricity. The pretreatment step comprises an alkaline absorption step (B1) for absorbing carbon dioxide or carbon dioxide and hydrogen sulfide contained in the digestion gas yielded in the methane fermentation step into an alkaline absorbent solution.

12 Claims, 8 Drawing Sheets

OTHER PUBLICATIONS

Staniforth, J., et al., "*Cannock Landfill Gas Powering a Small Tubular Solid Oxide Fuel cell—a Case Study*", Journal of Power of Sources, Ch, Elsevier Sequoia S.A. Lausanne, vol. 86, No. 1-2, Mar. 2000, pp. 401-403.

Patent Abstracts of Japan, vol. 1995, No. 10, Nov. 30, 1995 & JP 07 169495 A (Toshiba Corp), Jul. 4, 1995.
Patent Abstracts of Japan, vol. 1999, No. 10, Aug. 31, 1999 & JP 11 126629 (Toshiba Corp), May 11, 1999.

* cited by examiner

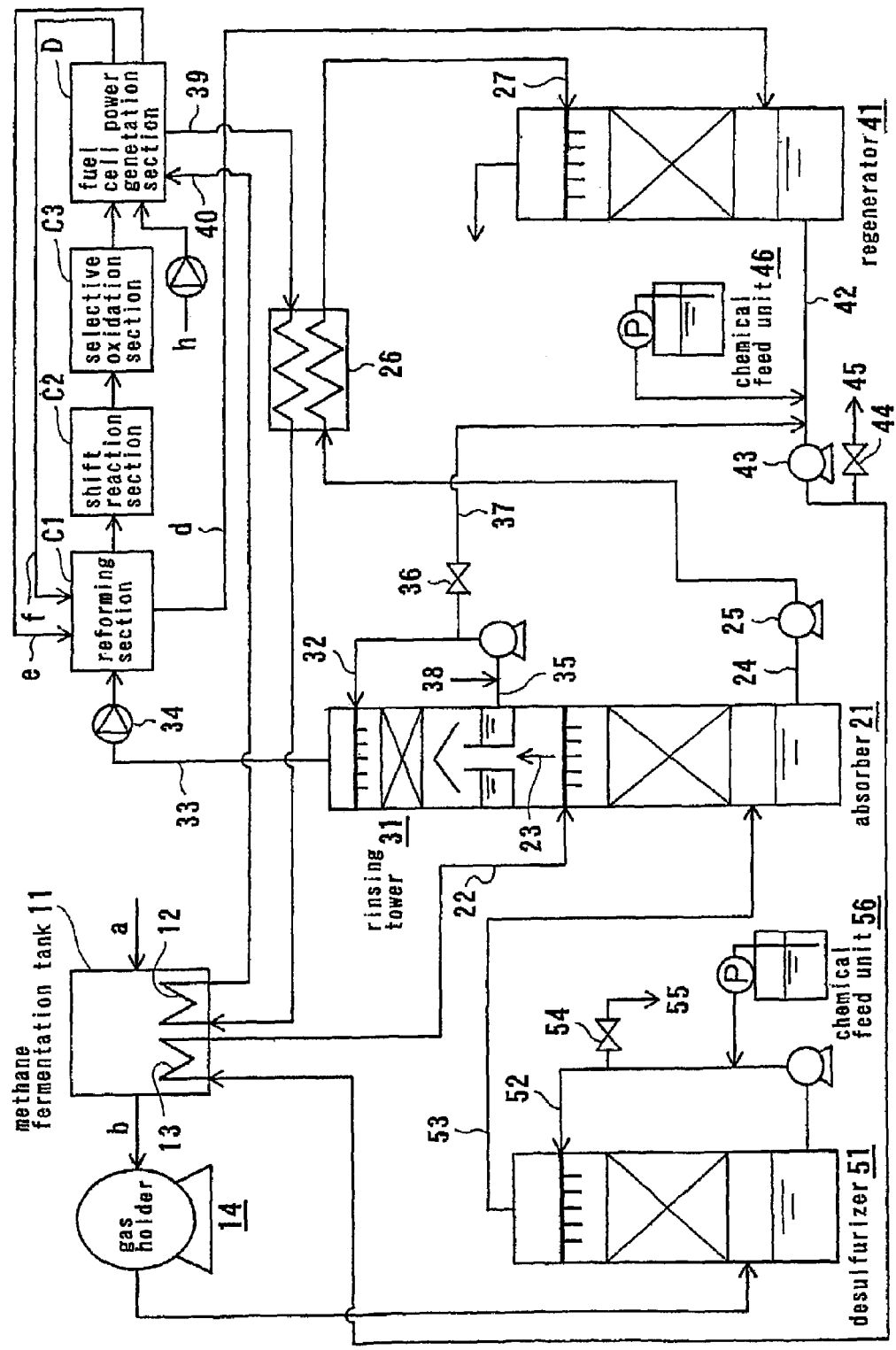
F I G. 6

FUEL CELL POWER GENERATION METHOD AND SYSTEM

TECHNICAL FIELD

The present invention relates to a technology for recovering chemical energy of organic matter in the form of a hydrogen gas and a technology for converting hydrogen gas to electric energy with high efficiency, and more particularly to a system for producing a hydrogen gas or a hydrogen-containing gas by methane fermentation of organic wastes such as relatively highly concentrated organic waste water or organic slurry to produce a digestion gas, and then processing of the thus produced digestion gas, and an electric generating system for generating electricity by supplying the produced hydrogen gas or hydrogen-containing gas to a fuel cell. The organic wastes include waste water discharged from food production, wastes from livestock farms, and excess sludge produced in sewage treatment plants or the like.

The present invention is also applicable to a methane fermentation gas produced in landfills or the like.

BACKGROUND ART

In recent years, there has been a growing tendency for environmental protection, and therefore an attempt has been made to reform a digestion gas or a biogas yielded in methane fermentation or the like of organic wastes into a hydrogen-containing gas which is then utilized to generate electricity in a fuel cell. Conventionally, for example, a digestion gas is pretreated to remove hydrogen sulfide and carbon dioxide therefrom for thereby enriching the concentration of methane in the gas, and the gas with a higher methane concentration is then reformed to produce a hydrogen-containing gas having a hydrogen content of 70 to 80%. The produced hydrogen-containing gas is then supplied as a fuel gas to the anode of a fuel cell while air is supplied as an oxidizing gas to the cathode of the fuel cell, thus generating electricity.

In general, a digestion gas produced in methane fermentation of sludge at a sewage treatment plant is pretreated by a method of wet absorption in which hydrogen sulfide and carbon dioxide are absorbed and separated by a large amount of treatment water from the sewage treatment plant. For a digestion gas produced in methane fermentation of organic matter other than the sludge in the sewage treatment, since a large amount of treatment water does not exist, hydrogen sulfide is removed by a method of dry adsorption with solid sorbents such as iron oxide and carbon dioxide is removed by membrane separation or pressure swing adsorption (PSA).

Further, in the pretreatment of the digestion gas, an attempt has also been made to perform only desulfurization without the separation of carbon dioxide, i.e., without the enrichment of methane.

The method of wet absorption with a large amount of treatment water has an advantage that no chemical is necessary. However, the carbon dioxide absorption capacity of the treatment water is so small that the size of the absorption apparatus has to be very large. Further, the dissolved oxygen and dissolved nitrogen in the treatment water are transferred to the gas after the treatment, and therefore oxygen and nitrogen contained in the gas after the absorption amount to several percents, thus limit the level of the enrichment of methane, and adversely affect the subsequent hydrogen production step and the fuel cell power generation step.

On the other hand, in the PSA or the membrane separation, power for increasing or decreasing the pressure of gas is necessary, and, in addition, the recovery rate of methane is low, disadvantageously leading to a lowered energy efficiency of the system. As for the dry adsorption of hydrogen sulfide, although the apparatus can be simplified, a high adsorption load of hydrogen sulfide causes an increase in running cost.

Further, in the case where the pretreatment does not involve the separation of carbon dioxide, the power necessary for blowing and pressurizing the digestion gas to the subsequent step of reforming is increased. In addition, the concentration of hydrogen in the reformed gas or hydrogen-containing gas is considerably low, and this poses a problem that the energy efficiencies of the reforming step and the fuel cell power generation step are disadvantageously lowered.

Further, the concentration of methane in digestion gas varies from fermentation tank to fermentation tank used for the production of methane. Even in the same fermentation tank, the methane concentration varies with the season or a fluctuation in fermentation conditions or the like, and the difference between the minimum concentration and the maximum concentration may reach 10%. A fluctuation of the methane concentration, i.e., the heating value of the gas supplied to the reforming step not only unstabilizes the operation of the hydrogen production step and thus the operation of the fuel cell power generation step, but also significantly impairs the energy efficiency of the total system. Therefore, it is important to keep the concentration of methane in the feed gas at a constant value as much as possible. In the conventional technology described above, however, it has been difficult or impossible to cope with this requirement.

DISCLOSURE OF INVENTION

The present invention has been made in view of the problems of the prior art, and it is an object of the present invention to provide a highly efficient fuel cell power generation system having reduced environment load wherein a hydrogen-containing gas suitable for use in a fuel cell, especially in a proton exchange membrane fuel cell is produced from a digestion gas yielded in methane fermentation of organic matter, and is then supplied to the fuel cell to generate electricity.

In order to achieve the above object, according to one aspect of the present invention, there is provided a fuel cell power generation method utilizing methane fermentation of organic matter, the method comprising: a methane fermentation step for subjecting organic matter to methane fermentation to yield an anaerobic digestion gas; a pretreatment step for pretreating the digestion gas yielded in the methane fermentation step; a hydrogen production step for producing a hydrogen-containing gas from the pretreated gas in the pretreatment step; and a fuel cell power generation step for supplying the hydrogen-containing gas produced in the hydrogen production step to a fuel cell to generate electricity; wherein the pretreatment step comprises an alkaline absorption step for absorbing carbon dioxide or carbon dioxide and hydrogen sulfide contained in the digestion gas with an alkaline absorbent solution to separate carbon dioxide or carbon dioxide and hydrogen sulfide from the digestion gas.

More specifically, in the alkaline absorption step, the digestion gas is brought into counterflow contact with the alkaline absorbent solution to transfer carbon dioxide or carbon dioxide and hydrogen sulfide into the alkaline absorbent solution to enrich the concentration of methane; and the fuel cell power generation method further comprising: a heat exchange step for heating the alkaline absorbent solution which has absorbed carbon dioxide or carbon dioxide and hydrogen sulfide therein in the alkaline absorption step, by waste heat generated in the hydrogen production step and/or the fuel cell power generation step; and a regeneration step for regenerating the alkaline absorbent solution by bringing the alkaline absorbent solution heated in the heat exchange step into counterflow contact with a cathode vent gas discharged from the fuel cell power generation step or a combustion exhaust gas discharged from the hydrogen production step to strip carbon dioxide or carbon dioxide and hydrogen sulfide from the alkaline absorbent solution. The gas after the absorption operation may be brought into counterflow contact with water to wash away absorbent solution droplets carried over into the gas. Further, the fuel cell power generation method according to the present invention may further comprise a desulfurization step wherein the digestion gas yielded in the methane fermentation step is brought into counterflow contact with a desulfurizing solution containing an alkali chemical and a water-soluble oxidizing agent to absorb and oxidatively decompose hydrogen sulfide, and is then supplied to the alkaline absorption step.

According to the present invention, the concentration of methane in the gas after the absorption operation can be controlled at a constant value by varying the flow rate and/or the temperature of the absorbent solution in the alkaline absorption step.

In the present invention, the hydrogen production step comprises a reforming step and a carbon monoxide shift reaction step. A carbon monoxide selective oxidation step may be additionally provided after the reforming step and the carbon monoxide shift reaction step. A proton exchange membrane fuel cell or a phosphoric acid fuel cell is suitable as the fuel cell used in the fuel cell power generation step.

The digestion gas yielded in the methane fermentation of organic matter varies with the type of the organic matter and methane fermentation conditions. In general, however, the digestion gas comprises 60 to 70% of methane as a main component, 30 to 40% of carbon dioxide, 0 to 2% of hydrogen, and 0 to 2% of nitrogen, and further contains several tens to several hundreds of ppm of hydrogen sulfide and hydrogen chloride as minor components.

However, as a raw gas supplied to the hydrogen production step, low hydrogen sulfide concentration, low oxygen concentration, and low nitrogen concentration, and methane concentration which is constant and is high as much as possible are required.

As described above, according to the present invention, the use of an alkaline absorbent solution having a high absorption capacity such as an absorbent solution of amine in the absorption of carbon dioxide or carbon dioxide and hydrogen sulfide can provide a compact absorption apparatus. The use of the alkaline absorbent solution can realize a methane recovery of nearly 100%, and can avoid the mixing of nitrogen gas, oxygen gas or the like in the methane gas. Therefore, the concentration of methane in the gas after the absorption can be steadily raised to 95% or more.

As a gas for the regenerating of the alkaline absorbent solution, the use of a cathode vent gas discharged from the fuel cell power generation step or a combustion exhaust gas discharged from the hydrogen production step makes it possible to utilize waste heat possessed by the combustion exhaust gas from the hydrogen production step and/or a part of waste heat with a poor value from the fuel cell power generation step, in heating the absorbent solution for its regeneration. Therefore, the alkaline absorbent solution can be regenerated by properly setting absorption conditions and regeneration conditions.

An anode vent gas discharged from the fuel cell power generation step is used as a fuel for maintaining the reforming temperature and supplying the reforming heat in the reforming step within the hydrogen production step. Here, there are two cases, one case where air is used as a combustion-supporting gas, and another case where a cathode vent gas discharged from the fuel cell power generation step is used as the combustion-supporting gas. When the cathode vent gas is used as the combustion-supporting gas, since the combustion exhaust gas discharged from the hydrogen production step has a carbon dioxide concentration of not more than 6%, this combustion exhaust gas can be utilized as a regeneration gas by properly setting the conditions for the regeneration of the alkaline absorbent solution in a regenerator within the absorption step. Specifically, according to the present invention, when the cathode vent gas is used as the combustion-supporting gas, the combustion exhaust gas is used as the regeneration gas, while, when air is used as the combustion-supporting gas, the combustion exhaust gas is utilized as a heat source for the alkaline absorbent solution at the time of the regeneration without the use of the combustion exhaust gas as the regeneration gas. In this case, the cathode vent gas is utilized as the regeneration gas. Furthermore, air can be additionally used as the regeneration gas.

Due to the mass balance of the system according to the present invention, the concentration of carbon dioxide in the regeneration off-gas discharged from the regenerator is not more than 10% when the combustion exhaust gas is used as the regeneration gas, and is not more than 5% when the cathode vent gas is used as the regeneration gas. Further, due to the heat balance of the system according to the present invention, heat necessary for the regeneration of the alkaline absorbent solution is not more than 50% of the stack waste heat discharged from the fuel cell power generation step.

The absorption conditions and regeneration conditions in the alkaline absorption step are set such that the temperature of the alkaline absorbent solution prior to regenerating in the regeneration step is lower than the temperature of the outlet of stack cooling water from the fuel cell power generation step by 10° C. or less, preferably 2° C. or less, while the temperature of the alkaline absorbent solution prior to absorbing in the alkaline absorption step is lower than the temperature of the alkaline absorption solution prior to regenerating in the range of 10° C. to 35° C., and is higher than the temperature of a methane fermentation liquid in the methane fermentation step by preferably 2° C. or more. The temperature of the outlet of stack cooling water varies with the type of the fuel cell used. This temperature of the outlet of stack cooling water, however, is generally in the range of 60 to 80° C. While in the case of a proton exchange membrane fuel cell using a high temperature-type membrane having a heat-resistant temperature of 100 to 130° C., the temperature of the outlet of stack cooling water is in the range of 100 to 120° C.

Thus, according to the present invention, the temperature of the alkaline absorbent solution prior to regenerating and the temperature of the alkaline absorbent solution prior to absorbing are properly set, and then the alkaline absorbent solution from the regeneration step is brought to the methane fermentation step to perform heat exchange with a methane fermentation liquid for thereby bringing the temperature of the alkaline absorbent solution to a predetermined temperature prior to absorbing, followed by supplying the alkaline absorbent solution to the absorption step. By virtue of this constitution, the methane fermentation liquid can be utilized as a coolant for the alkaline absorbent solution, and, in addition, the waste heat generated in the fuel cell power generation step can be utilized, in a cascade form, as a heat source for the regeneration of the alkaline absorbent solution and as a heat source for heating the methane fermentation liquid and retaining the temperature of the methane fermentation liquid. The methane fermentation liquid is large in quantity and stable in temperature, and hence is very suitable as a coolant for adjusting the temperature of the alkaline absorbent solution from the temperature after the regeneration to a predetermined temperature prior to absorbing. Therefore, the provision of a cooling tower or an air cooler is unnecessary in the pretreatment step according to the present invention.

Thus, the alkaline absorption step according to the present invention can be realized in terms of both mass balance and heat balance. Therefore, the present invention can enhance the energy efficiency of the system.

Further, the use of the alkaline absorption step or the desulfurization step according to the present invention for removing hydrogen sulfide can reduce the running cost even in the case of high hydrogen sulfide concentration.

In the present invention, each of the following methods may be adopted: a method wherein a desulfurization step is provided for hydrogen sulfide and the digestion gas is brought into couterflow contact with a hydrogen sulfide absorbent solution containing an alkali chemical and a water-soluble oxidizing agent in a desulfurizer to absorb and decompose hydrogen sulfide; and a method wherein the desulfurization step is not provided and hydrogen sulfide, together with carbon dioxide, is absorbed and separated in an alkaline absorption step. As a matter of course, when the hydrogen sulfide concentration is relatively low, method of dry adsorption using iron oxide or the like may be used.

Conventionally, in desulfurizing the digestion gas, it is a common practice to use a combination of a primary dry adsorption desulfurization after the fermentation step and a deep dry adsorption desulfurization before the hydrogen production step. Therefore, this conventional method is disadvantageous in that, particularly when the hydrogen sulfide load is high, the adsorbent has to be frequently replaced and this is troublesome and incurs high running cost. By contrast, according to the present invention, it is possible to perform, in a single step (i.e., the alkaline absorption step), the desulfurization of the digestion gas, the separation of carbon dioxide from the digestion gas, i.e., methane enrichment, and the stabilization of the concentration of methane in the pretreated gas. This can realize a simplified process with a low running cost.

When the method in which hydrogen sulfide is absorbed and removed in the alkaline absorption step is employed, the absorbed hydrogen sulfide is accumulated in the absorbent solution in an early stage of the operation. However, after the concentration of hydrogen sulfide in the absorbent solution reaches a certain value, the hydrogen sulfide, together with carbon dioxide, is stripped in the alkaline absorbent solution regeneration step and is transferred to the regeneration off-gas. According to the present invention, particularly when the concentration of hydrogen sulfide in the digestion gas is high, i.e., when the load of hydrogen sulfide is high, a biodesulfurization step characterized by low running cost can be provided as the desulfurization means to biodecompose hydrogen sulfide contained in the regeneration off-gas.

According to the biodecomposition of hydrogen sulfide, hydrogen sulfide is oxidized by microorganisms into sulfur or sulfuric acid, and hence the supply of oxygen is necessary. Conventionally, the biodesulfurization could not be adopted as the method for the desulfurization of digestion gas, because the introduction of air or oxygen into the digestion gas adversely affects the subsequent hydrogen production step. By contrast, according to the present invention, as described above, hydrogen sulfide contained in the digestion gas is once transferred from the digestion gas to the regeneration off-gas, and hence the adoption of the biodesulfurization becomes possible. In addition, according to the present invention, since an oxygen-containing combustion exhaust gas discharged from the hydrogen production step or an oxygen-containing cathode vent gas discharged from the fuel cell power generation step is used as the regeneration gas for the alkaline absorbent solution, the use of the biodesulfurization is highly suitable.

On the other hand, in the regeneration of the alkaline absorbent solution, the absorbent solution comes into contact with the regeneration gas, and, in this case, there is a fear that an amine-based absorbent is reacted with oxygen contained in the regeneration gas and thus is degraded by the oxidation. However, because the reactivity of hydrogen sulfide with oxygen is higher than that of the amine-based absorbent with oxygen, hydrogen sulfide contained in the absorbent solution can act as an antioxidant of the amine-based absorbent. Thus, according to the present invention, proper adjustment of the load of hydrogen sulfide in the alkaline absorption step can ensure complete desulfurization of the gas after the absorption and, at the same time, can suppress the degradation of the amine-based absorbent by oxidation.

When carbon dioxide and/or hydrogen sulfide are absorbed and separated by an absorption method, as the regeneration gas for the absorbent solution, it is a common practice to use steam, or otherwise air when steam is not available. While in the present invention, the combustion exhaust gas from the hydrogen production step or the cathode vent gas from the fuel cell power generation step is used as the regeneration gas, and this is based on the following consideration. Specifically, although the use of steam facilitates the regeneration of the alkaline absorbent solution, the provision of a high temperature heat source of 100° C. or above is necessary for generating steam. Further, air is advantageous as the regeneration gas in that carbon dioxide is not substantially contained, but the air is disadvantageous in that the temperature and the absolute humidity are so low that the absorbent solution being regenerated, temperature of which should be essentially kept high, is cooled due to steam evaporation, and that the high partial pressure of oxygen potentially enhances the oxidic degradation of the amine-based absorbent. By contrast, according to the present invention, the combustion exhaust gas from the hydrogen production step and the cathode vent gas from the fuel cell power generation step, which are used under properly set conditions of absorption and regeneration, have higher temperature and absolute humidity, that is, higher enthalpy, and lower partial pressure of oxygen as compared with air, and hence are very advantageous as the regeneration gas, so using of these gases eliminates the need of high temperature heat source.

Thus, the present invention can enhance the energy efficiency of the fuel cell power generation system and can improve the profitability.

BRIEF DESCRIPTION OF DRAWINGS

FIG. 6 is a block diagram showing a fuel cell power generation system according to an example of the third embodiment shown in FIG. 3;

BEST MODE FOR CARRYING OUT THE INVENTION

A fuel cell power generation system according to the first embodiment of the present invention will be described in detail with reference to the accompanying drawings.

Figure 1:
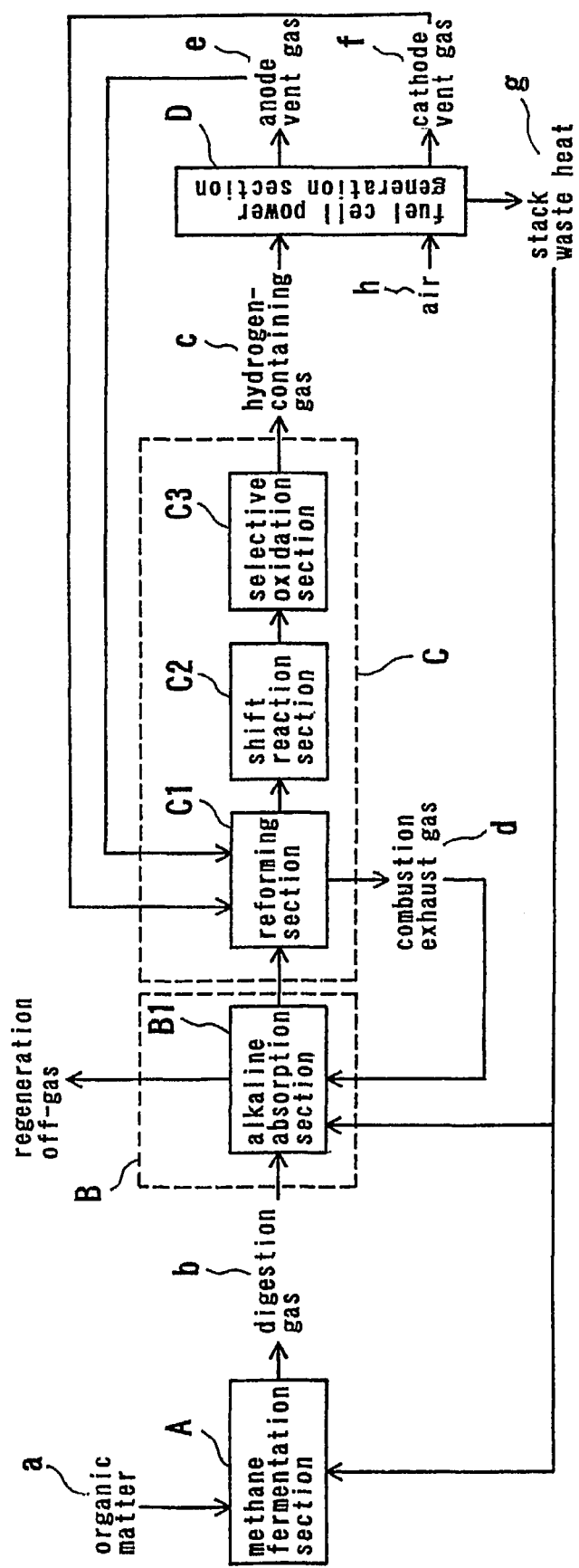
FIG. 1 is a block diagram of the fuel cell power generation system according to the first embodiment of the present invention.

FIG. 1 is a schematic block diagram showing the fuel cell power generation system according to the first embodiment.

As shown in FIG. 1, in this embodiment, organic matter a is fermented in a methane fermentation step A. An anaerobic digestion gas b produced in the methane fermentation step A is pretreated in a pretreatment step B, and the pretreated gas is processed in a hydrogen production step C to produce a hydrogen-containing gas c which is then supplied to a fuel cell power generation step D to generate electricity.

The hydrogen production step C comprises a reforming step C1 for catalytically reforming methane, contained in the gas pretreated in the pretreatment step B, with steam into hydrogen and carbon monoxide; a shift reaction step C2 for catalytically converting carbon monoxide, contained in the gas after the reforming, with steam into hydrogen gas and carbon dioxide; and a selective oxidation step C3 for catalytically reacting carbon monoxide, remaining in the gas after the shifting, with an introduced oxygen-containing gas to selectively oxidize and remove the residual carbon monoxide.

Here, a combustion exhaust gas d discharged from the reforming step C1 in the hydrogen production step C is utilized as a regeneration gas in an alkaline absorption step B1. A part of stack waste heat g from the fuel cell power generation step D is utilized for heating the alkaline absorbent solution for its regeneration, while the remaining part of the stack waste heat g is utilized for heating the methane fermentation liquid in the methane fermentation step A.

These steps will be explained in more detail.

A) Methane Fermentation Step

According to the present invention, organic matter, especially organic wastes, such as waste water discharged from food production, waste water from livestock farms, or excess sludge yielded in a biological treatment of sewage or the like, is subjected to methane fermentation to yield a digestion gas which is then used to produce a hydrogen gas or a hydrogen-containing gas. The hydrogen gas or the hydrogen-containing gas is then supplied to a fuel cell to generate electricity, while waste heat generated in the fuel cell power generation step is utilized as a heat source for the methane fermentation step.

In the methane fermentation step A, digestion by microorganisms under anaerobic conditions for a residence time of 20 to 30 days decomposes about 50% of the organic matter according to the following reaction formula to produce a methane gas and carbon dioxide.

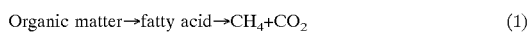

$$\text{Organic matter} \rightarrow \text{fatty acid} \rightarrow CH_4 + CO_2 \qquad (1)$$

There is no particular limitation on conditions for the methane fermentation step A. However, medium-temperature fermentation at a temperature of 30 to 35° C. is suitable from the viewpoints of the residence time and the efficiency. In this case, stack waste heat g (described below) generated in the fuel cell power generation step D and heat exchanged in the cooling of the alkaline absorbent solution after the regeneration in the alkaline absorption step B1 are used as the heat source for heating the fermentation liquid and maintaining the temperature of the fermentation liquid.

B) Pretreatment Step-Alkaline Absorption Step

According to the present invention, an alkaline absorption step B1 is provided as the pretreatment step B. In this step, the digestion gas is led to an absorber, where the digestion gas is brought into counterflow contact with an alkaline absorbent solution to absorb carbon dioxide or carbon dioxide and hydrogen sulfide (hereinafter referred to as "carbon dioxide and the like"), thereby separating carbon dioxide and the like from the digestion gas. The alkaline absorbent solution, which has been discharged from the absorber, is heated by waste heat d, g generated in the hydrogen production step C and/or the fuel cell power generation step D, and is then transferred to the regenerator where the alkaline absorbent solution is regenerated with a combustion exhaust gas d discharged from the hydrogen production step C or the cathode vent gas f discharged from the fuel cell power generation step D. The regenerated alkaline absorbent solution is returned to the absorber.

The absorber and the regenerator and a rinsing tower and a desulfurizer (described below) are packed with packing. Any type of packing may be used as long as the packing has satisfactory corrosion resistance and heat resistance and, at the same time, has high contact efficiency. An absorbent solution of potassium carbonate or an absorbent solution of an alkanolamine is suitable as the absorbent solution used in the absorber. According to the present invention, the absorbent solution of an alkanolamine is more preferred, because this absorbent solution has high absorption capacity and, in addition, can perform absorption and regeneration at a temperature under 80° C. which can be provided by utilizing the waste heat g with a poor value generated in the fuel cell power generation step D and/or the waste heat of the combustion exhaust gas d discharged from the hydrogen production step C. Specific examples of absorbents applicable herein include monoethanolamine (MEA), diethanolamine (DEA), and methyldiethanolamine (MDEA) and the like. A reaction involved in the absorption of carbon dioxide into the absorbent solution of an alkanolamine is represented by the following formula:

$$R-NH_2 + H_2O + CO_2 \rightarrow R-NH_3HCO_3 \qquad (2)$$

The regeneration reaction is a reverse reaction of the reaction (2).

The gas which has passed through the alkaline absorption step B1 is transferred to the hydrogen production step C as the next step. In this case, when the content of sulfur in the gas has not been satisfactorily lowered, a dry adsorption desulfurizer may be provided between the alkaline absorption step B1 and the hydrogen production step C.

C) Hydrogen Production Step

1) Reforming Step

According to the present embodiment, a reforming step C1 is provided in the hydrogen production step C to perform the following steam reforming reaction in a reforming reactor packed with a reforming catalyst.

$$CH_4+H_2O \rightarrow CO+3H_2 \quad (3)$$

Steam generated in a steam boiler using, as a heat source, the sensible heat of the reformed gas is added as the steam necessary for the reaction. The amount of the steam added is preferably in the range of 2.5 to 3.5 in terms of the molar ratio of steam to methane, i.e., S/C ratio. This reforming reaction is an endothermic reaction. Therefore, a higher reaction temperature lowers the equilibrium concentration of methane and enhances the reaction rate, while leads to a lower thermal efficiency. For this reason, the reaction temperature is preferably in the range of 650 to 800° C. The supply of reaction heat and the retention of the reaction temperature are carried out by using combustion heat of an anode vent gas e, discharged from the fuel cell power generation step D. The type and form of the catalyst are not particularly limited as long as the reforming reaction can be accelerated. Catalysts suitable for use in the above temperature range include nickel-based, ruthenium-based, platinum-based, nickel-ruthenium-based, and ruthenium-platinum-based steam reforming catalysts and composite ones of these catalysts.

2) Shift Reaction Step

Further, a shift reaction step C2 is provided in the hydrogen production step C to perform the following shift reaction in a shift reactor packed with a shift reaction catalyst.

$$CO+H_2O \rightarrow CO_2+H_2 \quad (4)$$

Steam contained in the gas after reforming is utilized as steam necessary for the reaction. The shift reaction is an exothermic reaction. Therefore, a lower reaction temperature lowers the equilibrium concentration of carbon monoxide, while brings the reaction rate down. For this reason, the reaction temperature is preferably in the range of 200 to 250° C. The type and form of the catalyst are not particularly limited as long as the shift reaction can be accelerated. Catalysts suitable for use in the above temperature range include copper-zinc-base shift reaction catalysts.

3) Selective Oxidation Step

When a proton exchange membrane fuel cell is employed in the fuel cell power generation step D, a selective oxidation step C3 is provided in the hydrogen production step C to further lower the concentration of carbon monoxide in the gas after the shift reaction to not more than 100 ppm, preferably not more than 10 ppm. That is, the following selective oxidation reaction is carried out by supplying an oxygen gas to a selective oxidation reactor packed with a selective oxidation catalyst while leading the above gas to the selective oxidation reactor.

$$CO+1/2O_2 \rightarrow CO_2 \quad (5)$$

The larger the amount of oxygen supplied, the lower the concentration of the residual carbon monoxide. The amount of oxygen, however, is preferably around 2 equivalents to carbon monoxide. The reaction temperature is preferably in the range of 100 to 150° C. Any catalyst may be used without particular limitation as long as the catalyst has high selectivity for oxidation of carbon monoxide and can realize high reaction rate. For example, a platinum-based catalyst or a gold catalyst with gold supported on alumina is suitable.

D) Fuel Cell Power Generation Step

According to this embodiment, the hydrogen-containing gas c produced in the hydrogen production step C has a relatively low temperature, a high hydrogen concentration, and a low carbon monoxide content. Therefore, the fuel cell employed is preferably a phosphoric acid fuel cell or especially a proton exchange membrane fuel cell, operatable at a relatively low temperature. Electrochemical reactions involved in the phosphoric acid or proton exchange membrane fuel cell are as follows:

$$\text{Anode reaction: } H_2 \rightarrow 2H^+ + 2e^- \quad (6)$$

$$\text{Cathode reaction: } 1/2O_2 + 2H^+ + 2e^- \rightarrow H_2O \quad (7)$$

More specifically, the hydrogen-containing gas c is supplied to the anode compartment in a fuel cell stack while an oxygen-containing gas h is supplied to the cathode compartment, whereby electricity is generated by the reactions in the cell. The operating temperature of the phosphoric acid fuel cell and the operating temperature of the proton exchange membrane fuel cell are around 200° C. and around 80° C., respectively. Since, however, these reactions are exothermic reactions, the stacks should be cooled to maintain the above operating temperatures. According to the present invention, outlet of stack cooling water (low-temperature warm water in the case of the phosphoric acid fuel cell) g is used as a heat source for the regeneration of the alkaline absorbent solution and as a heat source for the methane fermentation liquid. Thus, the energy efficiency of the whole system can be enhanced.

Further, in the fuel cell power generation, in order to ensure the power generation efficiency and the durability of the stack, it is a common practice to leave about 30% of the hydrogen gas supplied to the anode compartment in the stack without consuming 100% of the supplied hydrogen gas and to discharge it as an anode vent gas e from the stack. According to this embodiment, as described above, the anode vent gas e is utilized as a fuel in the reforming step C1, while the discharged combustion exhaust gas and the cathode vent gas f are utilized for the regeneration of the alkaline absorbent solution in the regeneration step.

Figure 4:
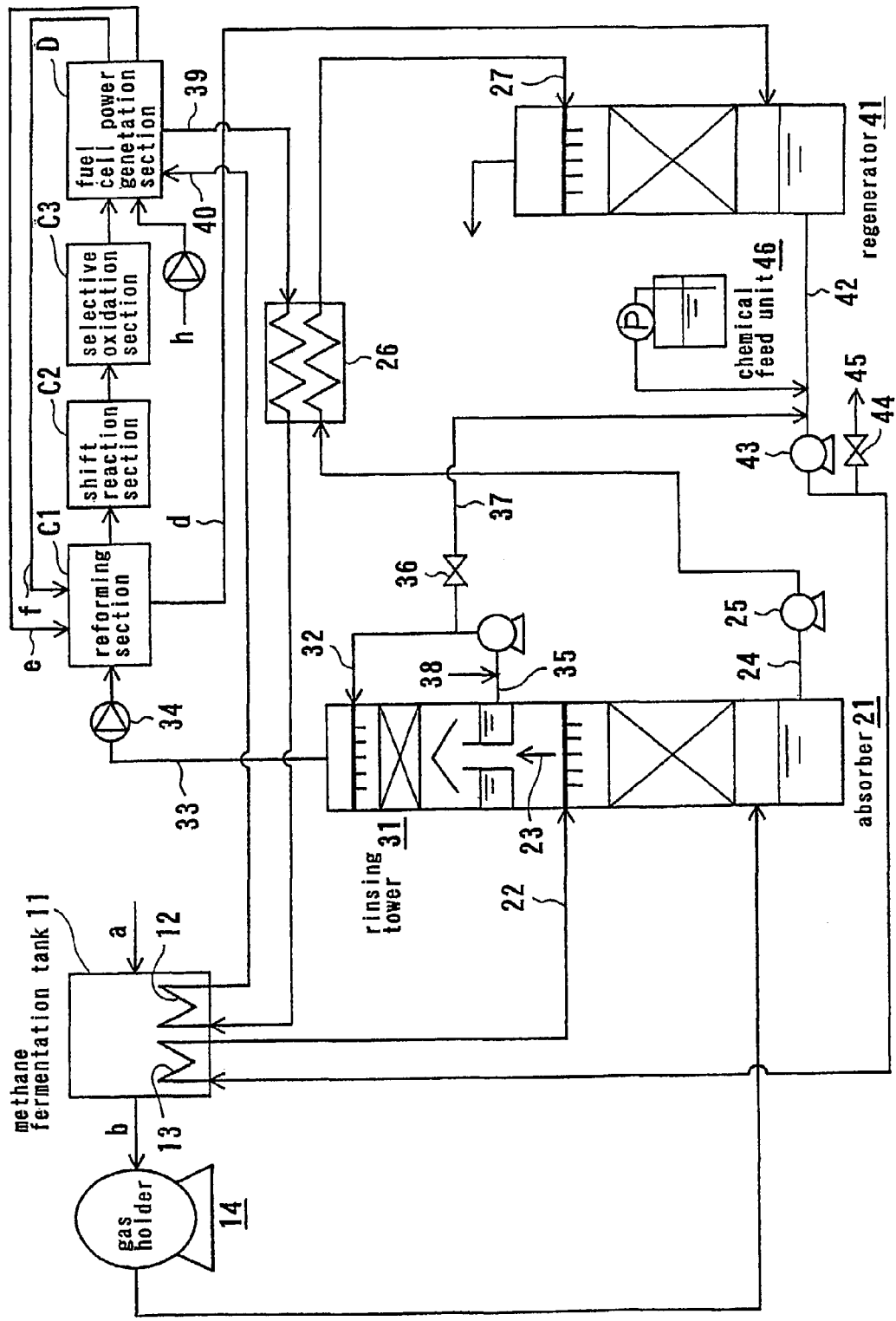
FIG. 4 is a block diagram showing a fuel cell power generation system according to an example of the first embodiment shown in FIG. 1.

Next, an example of the first embodiment will be described with reference to FIG. 4. FIG. 4 is a diagram showing the fundamental constitution of the fuel cell power generation system according to this example.

At the outset, organic matter a is fermented in a fermentation tank 11 for the methane fermentation step A to yield a digestion gas b. The digestion gas b is passed through a digestion gas holder 14 and is led to the bottom of an absorber 21 for performing an alkaline absorption step B1. In this absorber 21, the digestion gas b is brought into counterflow contact with the alkaline absorbent solution 22 to absorb and remove carbon dioxide and hydrogen sulfide. In this case, carbon dioxide is removed by absorption so that the concentration of the residual carbon dioxide in the gas 23 after the absorption is not more than 10%, preferably not more than 5%, while hydrogen sulfide is removed by absorption so that the concentration of the residual hydrogen sulfide in the gas 23 after the absorption is not more than 10 ppm, preferably not more than 1 ppm, more preferably not more than 0.1 ppm.

The gas 23 after the absorption, which has been discharged from the head of the absorber 21, enters a rinsing tower 31 installed at the upper part of the absorber 21, where the gas 23 is brought into counterflow contact with rinsing water 32 to wash away absorbent solution droplets carried over from the absorber 21. The gas 33 after the rinsing operation, which has been discharged from the rinsing tower 31, is transferred by a blower 34 to the reforming step C1 in the hydrogen production step C as the next step. According to the present invention, in the alkaline absorption step B1, carbon dioxide contained in the digestion gas b can be separated and removed by 90% or more. Therefore, as compared with the case where the alkaline absorption step is not provided, the power of blower 34 for blowing and boosting can be reduced by about 40%.

As a result of the rinsing operation, the concentration of the alkaline absorbent in the rinsing water 35 is gradually increased. Therefore, in this example, a part of the rinsing water 35 is always withdrawn through a valve 36, and pure make-up water 38 in an amount corresponding to the withdrawn rinsing water 37 is added to the rinsing water. The withdrawn rising water 37 is utilized as make-up water for the alkaline absorbent solution 22. Further, condensate recovered by cooling and condensate separating of the regeneration off-gas 47 also may be used as the make-up water 38.

Here, the alkaline absorbent solution 24 with carbon dioxide and hydrogen sulfide being absorbed thereinto (hereinafter referred to as the "alkaline absorbent solution after the absorption operation") is transferred from the bottom of the absorber 21 to a heat exchanger 26, for a heat exchange step, by a liquid delivery pump 25. In this heat exchanger 26, the heat exchange step is carried out. More specifically, the heat exchange between the alkaline absorbent solution 24 after the absorption operation and the outlet of stack cooling water 39 from the fuel cell power generation step D is carried out, whereby the alkaline absorbent solution 24 after the absorption operation is heated to a temperature lower than the temperature of the outlet of stack cooling water 39 by 10° C. or less, preferably about 2° C. or less.

The alkaline absorbent solution 27 thus heated is led to the inlet at the top of a regenerator 41 for a regeneration step. In the regenerator 41, the heated alkaline absorbent solution 27 is brought into counterflow contact with the combustion exhaust gas d discharged from the reforming step C1. As a result, carbon dioxide and hydrogen sulfide absorbed into the alkaline absorbent solution are stripped from the alkaline absorbent solution, and hence the alkaline absorbent solution is regenerated.

The alkaline absorbent solution 42 after the regeneration operation (hereinafter referred to as the "regenerated alkaline absorbent solution") is transferred from the bottom of the regenerator 41 to the heat exchanger 13 in the methane fermentation tank 11 by a liquid delivery pump 43. This heat exchanger 13 cools the regenerated alkaline absorbent solution 42 to a temperature which is lower than the temperature of the alkaline absorbent solution 27 (before the regeneration) at the inlet at the top of the regenerator 41 by about 10 to 35° C., and is higher than the temperature of the methane fermentation liquid contained in the fermentation tank 11 by 2° C. or more. The cooled alkaline absorbent solution 22 is again led to the top of the absorber 21. This permits a considerable amount of the heat supplied for the regeneration to be reused for heating the methane fermentation liquid. It should be noted that, instead of the heat exchanger 13, a water cooler or an air cooler also may be used to cool the regenerated alkaline absorbent solution 42.

The repeated use of the alkaline absorbent solution results in a gradual degradation of some active component. Therefore, in this example, a part of the regenerated alkaline absorbent solution 42 is always withdrawn through a valve 44, and a fresh absorbent solution in an amount corresponding to the withdrawn solution 45 is introduced through a chemical feed unit 46 into the system. Here, a part of hydrogen sulfide accumulated in the alkaline absorbent solution 27 is oxidized with oxygen contained in the combustion exhaust gas d for the regeneration, and there is a fear that sulfuric acid formed by this oxidation lowers the pH value of the absorbent solution. In this case, blending potassium hydroxide or sodium hydroxide into the fresh absorbent solution to be supplied allows the pH value of the absorbent solution being kept constant.

The gas 33 after the rinsing operation is subjected to steam reforming in the reforming step C1, and is then passed through the carbon monoxide shift reaction step C2 and the carbon monoxide selective oxidation step C3 to produce a hydrogen-containing gas. Next, the hydrogen-containing gas, and air h as an oxidizing agent are supplied to the fuel cell power generation step D, where fuel cell power generation is carried out. In this case, when the fuel cell employed in the fuel cell power generation step D is a phosphoric acid fuel cell, the carbon monoxide selective oxidation step C3 is unnecessary.

In this example, both the anode vent gas e and the cathode vent gas f discharged from the fuel cell power generation step D are supplied to a burner in the reforming step C1, and, as described above, the combustion exhaust gas d discharged from the reforming step C1 is utilized as a regeneration gas in the regenerator 41 of the regeneration step.

Further, as described above, after the heat exchange between the outlet of stack cooling water 39 from the stack in the fuel cell power generation step D, and the alkaline absorbent solution 24 after the absorption operation is carried out with the heat exchanger 26, and the heat exchange between the outlet of stack cooling water 39 and the methane fermentation liquid is further carried out with the heat exchanger 12 in the methane fermentation tank 11, the outlet of stack cooling water 39 is thus brought to a predetermined temperature, and then is returned as inlet of cooling water 40 to the stack.

Next, the second embodiment of the fuel cell power generation system according to the present invention will be described in detail with reference to the accompanying drawings.

Figure 2:
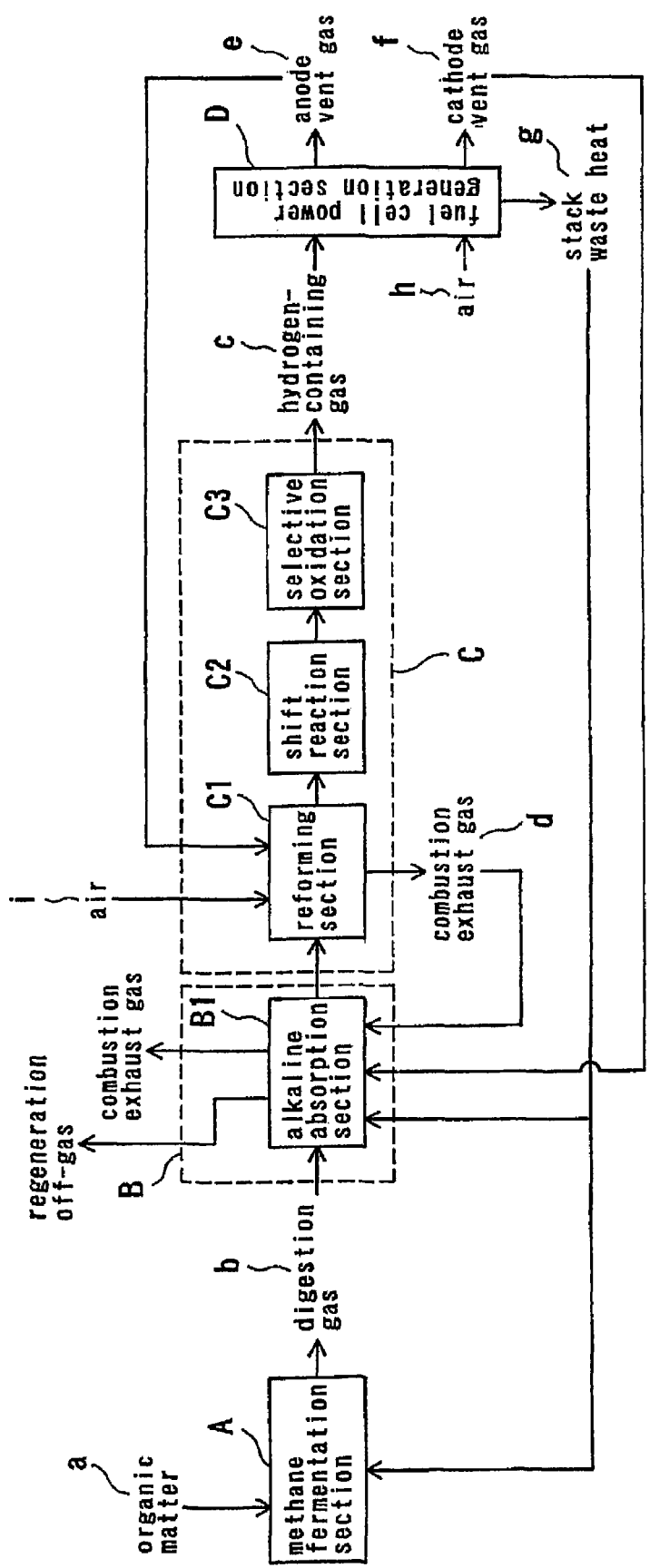
FIG. 2 is a block diagram of the fuel cell power generation system according to the second embodiment of the present invention.

FIG. 2 is a schematic block diagram showing the fuel cell power generation system according to this embodiment. In FIG. 2, steps and elements identical to or corresponding to those in FIG. 1 have the same reference characters as used in FIG. 1. In the second embodiment, portions not specifically referred to herein are the same as those in the first embodiment.

According to this embodiment, as shown in FIG. 2, the combustion exhaust gas d discharged from the reforming step C1 in the hydrogen production step C is utilized as a heat source for regeneration in the alkaline absorption step B1, while the cathode vent gas f discharged from the fuel cell power generation step D is utilized as a regeneration gas in the alkaline absorption step B1. Further, a part of the stack waste heat g from the fuel cell power generation step D is utilized for heating the alkaline absorbent solution for its regeneration, while the remainder of the stack waste heat g is utilized for heating the methane fermentation liquid in the methane fermentation step A.

Figure 5:
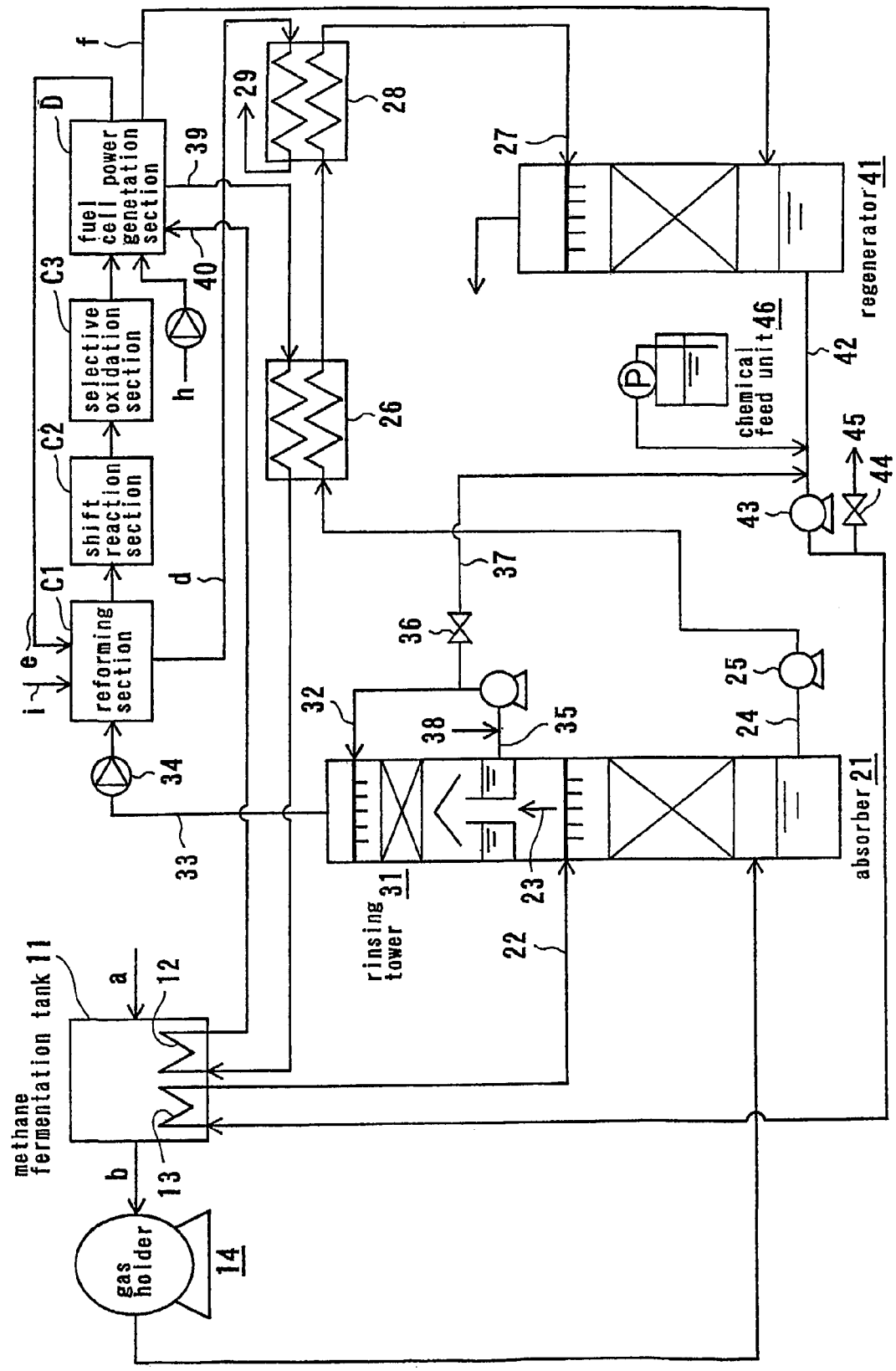
FIG. 5 is a block diagram showing a fuel cell power generation system according to an example of the second embodiment shown in FIG. 2.

Next, the first example of the second embodiment will be described with reference to FIG. 5. FIG. 5 shows the fundamental constitution of the fuel cell power generation system according to this example.

In this example, since air i is used as a combustion-supporting gas in the reforming step C1 with the hydrogen production step C, the combustion exhaust gas d discharged from the reforming step C1 is led to an additionally installed heat exchanger 28. A heat exchange step is carried out also with this heat exchanger 28. More specifically, after the heat exchange with the alkaline absorbent solution 24, the combustion exhaust gas 29 after the heat exchange is exhausted. Here, the cathode vent gas f discharged from the fuel cell power generation step D is led as a regeneration gas to the regenerator 41. The constitution except points referred above is the same as the constitution of the example of the first embodiment, and thus the explanation thereof will be omitted.

Next, the second example of the second embodiment will be described with reference to FIG. 7. This example is the same as the first example, except that means for controlling the concentration of methane in the gas 33 after the absorption operation to a certain value is incorporated.

Figure 7:
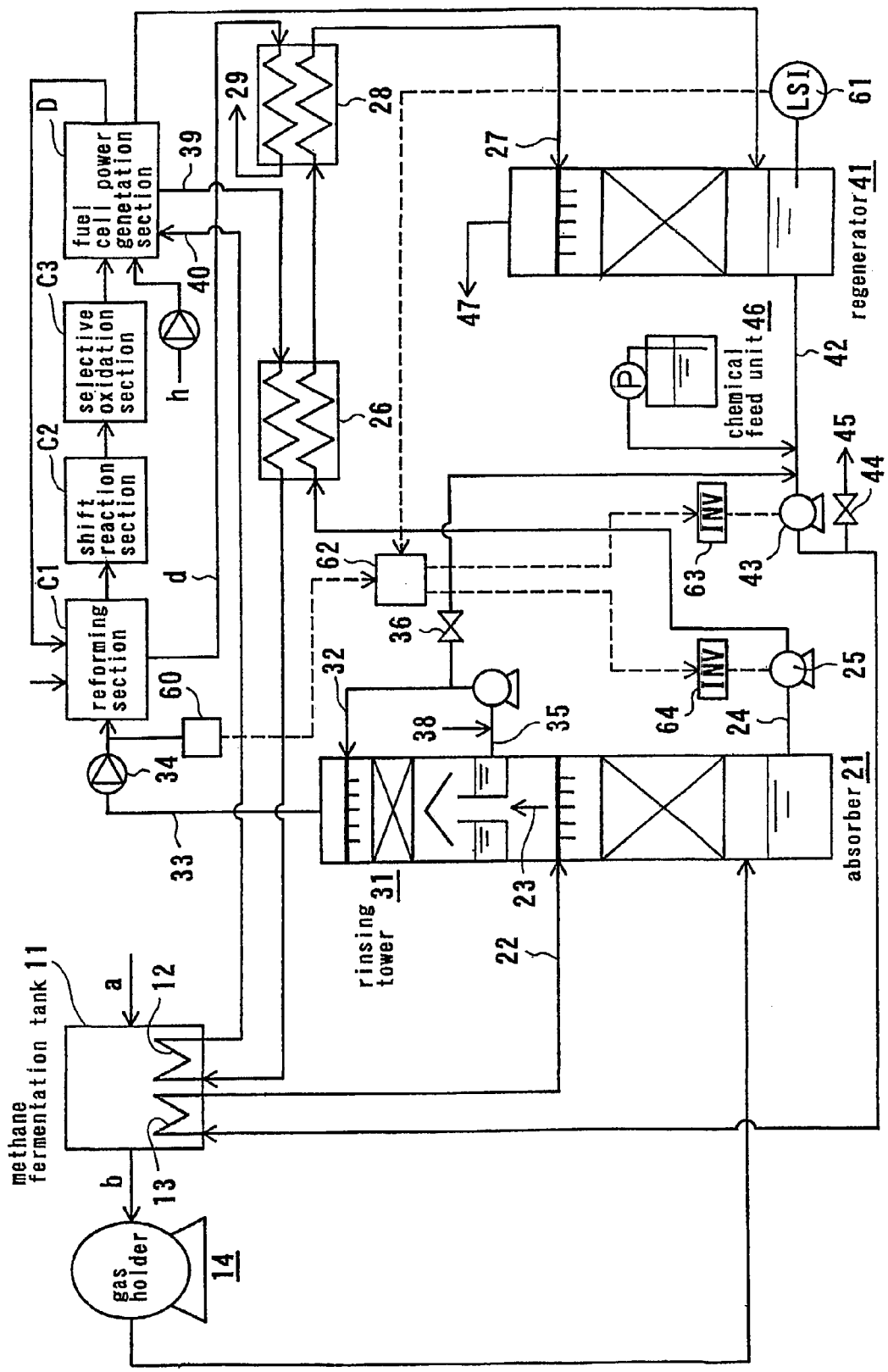
FIG. 7 is a block diagram showing a fuel cell power generation system according to the second example of the second embodiment shown in FIG. 2.

As shown in FIG. 7, in this example, there are provided methane concentration detection means 60, level detection means 61 for the level of the solution stored in the tank of the regenerator 41, a controller 62, and inverters 63, 64. For example, when the concentration of methane in the digestion gas b gets down due to some causes, the concentration of methane in the gas 33 after the absorption operation also tends to get down if no measure is taken. In this example, this unfavorable phenomenon can be avoided by the following procedure. Specifically, the tendency of decreasing in the methane concentration is detected by the methane concentration detection means 60, and a detection signal is sent to the controller 62. The controller 62 compares the detection signal with the set value, and sends a control signal to the inverter 63 so as to increase the frequency. Then, the inverter 63 raises the rotational speed of the pump 43 to increase the flow rate of the alkaline absorbent solution 22 supplied to the absorber 21. This in turn increases the absorption capacity of the absorber 21, and thus results in maintaining the concentration of methane in the gas 33 to a certain value. However, this brings a decreasing tendency to the level of the solution stored in the tank of the regenerator 41. Here, the detection signal output from the level detection means 61 is sent to the controller 62 which then sends a control signal to the inverter 64 to raise the rotational speed of the pump 25. Thus, the level of the solution stored in the tank is kept unchanged. According to this example, even in the situation when the concentration of methane in the digestion gas b gets high due to some causes, the concentration of methane in the gas 33 can also be kept constant, although a detailed explanation thereof is omitted.

Any detection means may be used as the methane concentration detection means as long as the methane concentration can be detected. However, a continuous infrared absorption-type methane concentration meter is preferable. Further, carbon dioxide detection means may be used instead of the methane concentration detection means. Further, instead of the methane concentration detection means or the carbon dioxide detection means, hydrogen concentration detection means (not shown in FIG. 7) for detecting the concentration of hydrogen in the hydrogen-containing gas c obtained from the hydrogen production step C may also be used for controlling the hydrogen concentration to a certain value, so as to secure a steady and efficient operation in the fuel cell power generation step D.

The capacity of the alkaline absorbent solution 22 to absorb carbon dioxide increases with lowering its temperature. Therefore, according to the present invention, in addition to the flow rate of the alkaline absorbent solution in the absorber, the temperature of the absorbent solution can also be used as an operational leverage for controlling the concentration of methane in the gas 33 after the absorption operation or the concentration of hydrogen in the hydrogen-containing gas c after the hydrogen production step C, although this is not shown in the drawing. Of course, the combination of the flow rate and the temperature of the absorbent solution may also be used.

Next, the third embodiment of the fuel cell power generation system according to the present invention will be described in detail with reference to the accompanying drawings.

Figure 3:
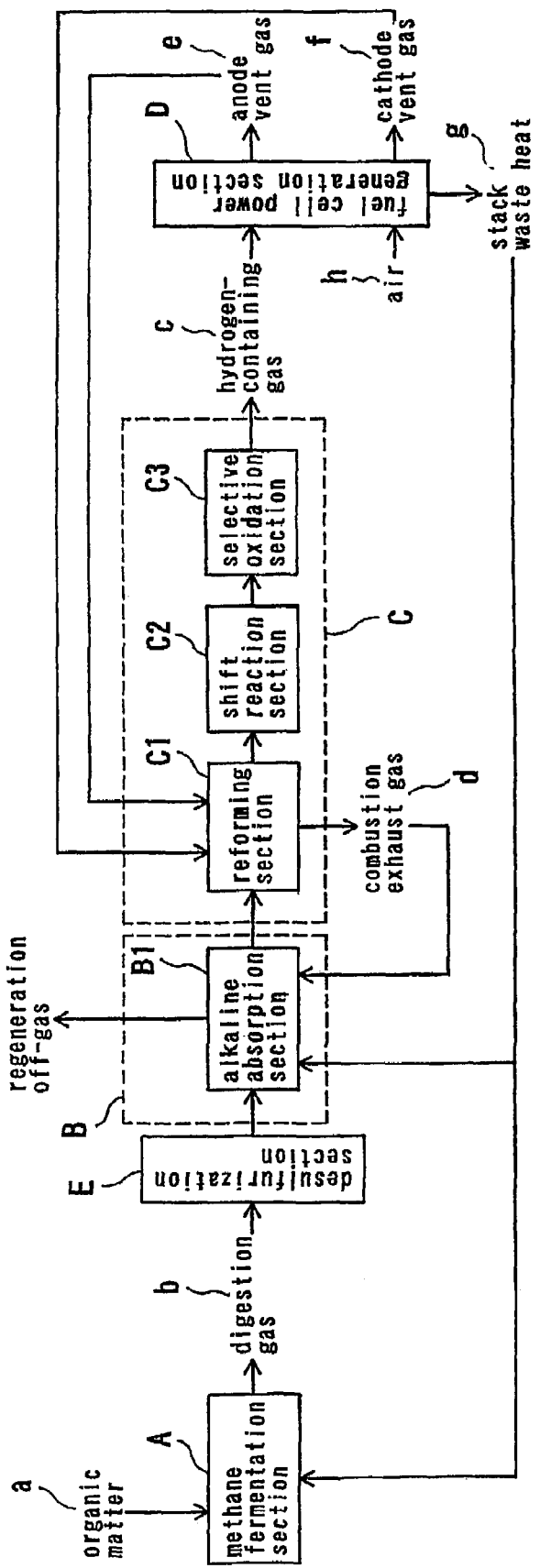
FIG. 3 is a block diagram of the fuel cell power generation system according to the third embodiment of the present invention.

FIG. 3 is a schematic block diagram showing the fuel cell power generation system according to this embodiment. In FIG. 3, steps and elements identical to or corresponding to those in FIG. 1 have the same reference characters as used in FIG. 1. In the third embodiment, portions not specifically referred to herein are the same as those in the first embodiment.

According to this embodiment, as shown in FIG. 3, the combustion exhaust gas d discharged from the reforming step C1 within the hydrogen production step C is utilized as a regeneration gas in the alkaline absorption step B1. In this system, of course, the combustion exhaust gas d discharged from the reforming step C1 may be utilized as a heat source for the regeneration in the alkaline absorption step B1, while the cathode vent gas f discharged from the fuel cell power generation step D may be utilized as a regeneration gas in the alkaline absorption step B1. Further, a part of the stack waste heat g discharged from the fuel cell power generation step D is utilized for heating the alkaline absorbent solution for its regeneration, while the remainder of the stack waste heat g is utilized for heating the methane fermentation liquid in the methane fermentation step A.

According to this embodiment, there is provided a desulfurization step E in which the digestion gas b yielded in the methane fermentation step A is brought into counterflow contact with a desulfurizing solution containing an alkali chemical and a water-soluble oxidizing agent to absorb and oxidatively decompose hydrogen sulfide. For example, caustic soda and potassium hydroxide are suitable as the alkali chemical, and chlorine-based oxidizing agent, bromine-based oxidizing agent, and hydrogen peroxide are suitable as the water-soluble oxidizing agent. When caustic soda is used as the alkali chemical with sodium hypobromite being used as the water-soluble oxidizing agent, the following absorption reaction and oxidative decomposition reaction take place.

$$H_2S + NaOH \rightarrow NaHS + H_2O \quad (8)$$

$$NaHS + 3NaOBr \rightarrow NaHSO_3 + 3NaBr \quad (9)$$

An example of the third embodiment will be described with reference to FIG. 6. FIG. 6 shows the fundamental constitution of the fuel cell power generation system according to this example.

In this example, the digestion gas b is introduced into a desulfurizer 51 for a desulfurization step E. In the desulfurizer 51, the digestion gas b is brought into counterflow contact with a desulfurizing solution 52. This operation permits hydrogen sulfide to be absorbed and oxidatively decomposed so that the concentration of hydrogen sulfide in the gas 53 after the desulfurization operation is not more than 10 ppm, preferably not more than 1 ppm, more preferably not more than 0.1 ppm. As a result of the desulfurization operation, the desulfurizing solution 52 is gradually deteriorated. Therefore, in this example, a part of the desulfurizing solution 52 is always withdrawn through a valve 54, and a fresh desulfurizing solution in an amount corresponding to the withdrawn solution 55 is introduced into the system through a chemical feed unit 56.

The gas 53 desulfurized in the desulfurizer 51 is then sent to the absorber 21 for the alkaline absorption step B1. Operation after the treatment in the absorber 21 is the same as that in the first example of the first embodiment, and thus the explanation thereof will be omitted.

Next, the fourth embodiment of the fuel cell power generation system according to the present invention will be described in detail with reference to the accompanying drawings.

Figure 8:
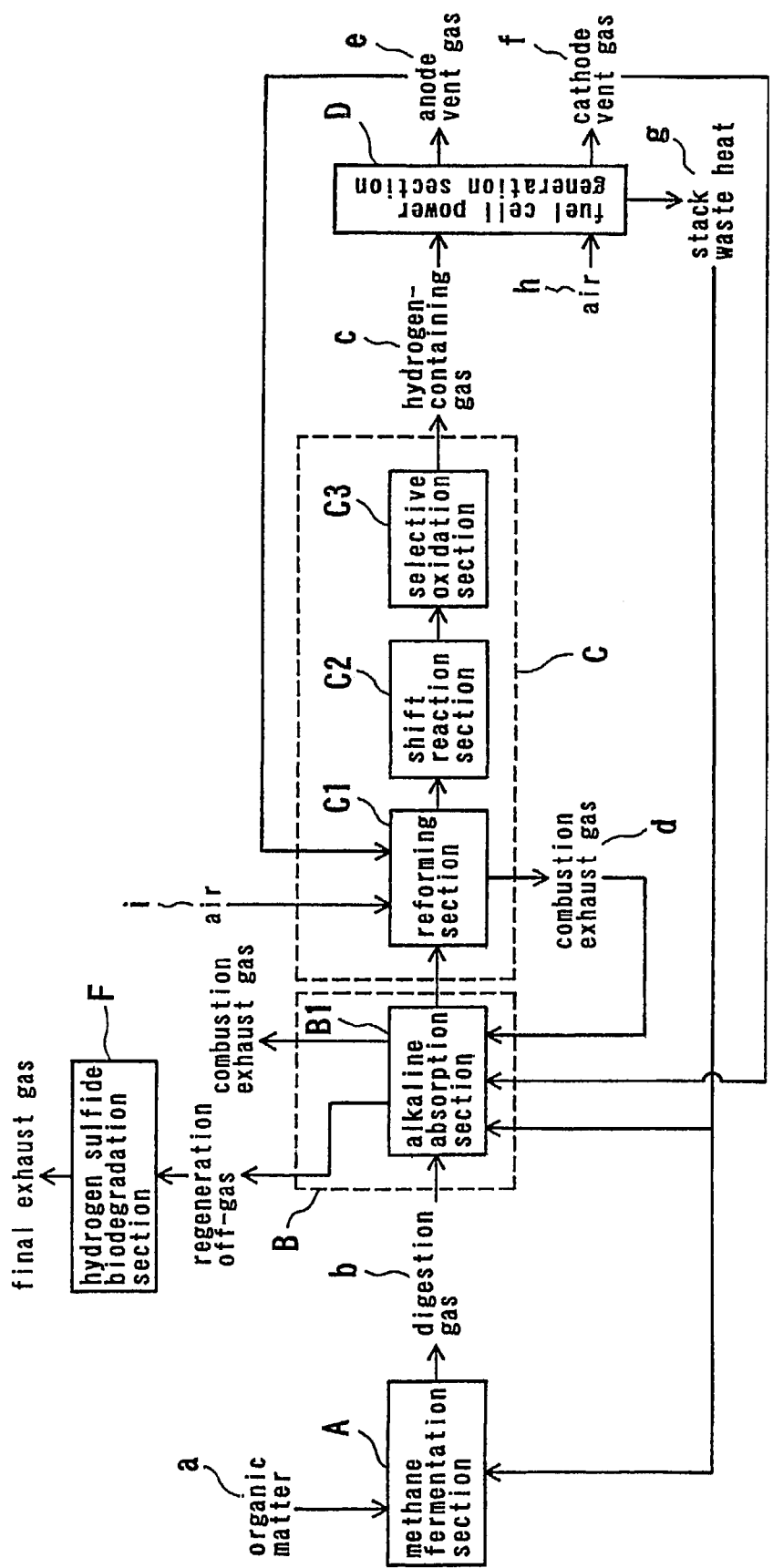
FIG. 8 is a block diagram of the fuel cell power generation system according to the fourth embodiment of the present invention.

FIG. 8 is a schematic block diagram showing the fuel cell power generation system according to this embodiment. In FIG. 8, steps and elements identical to or corresponding to those in FIG. 2 have the same reference characters as used in FIG. 2. In the fourth embodiment, portions not specifically referred to herein are the same as those in the second embodiment.

According to this embodiment, as shown in FIG. 8, a hydrogen sulfide biodegradation step F is provided. The regeneration off-gas discharged from the alkaline absorption step B is led to the hydrogen sulfide biodegradation step F to biodegrade, by microorganisms, hydrogen sulfide contained in the gas into sulfur or sulfuric acid. The gas after the biodesulfurization operation is discharged as a final exhaust gas.

As described above, according to the present invention, the desulfurization, the separation of carbon dioxide, and the stabilization of methane concentration of the digestion gas yielded in the methane fermentation of organic matter can be simultaneously carried out in a single step, i.e., in the alkaline absorption step. This can realize a simplified fuel cell power generation system using a digestion gas, coupled with a reduced running cost. Further, since methane in a digestion gas can be steadily enriched to a certain concentration up to 95% or even higher, the hydrogen production step and the fuel cell power generation step can be stably operated. Further, the recovery rate of methane is approximately 100%, and the power consumption is also small. In addition, waste heat with a poor value generated in the hydrogen production step and the fuel cell power generation step can be utilized in a cascade form. Therefore, the energy efficiency of the whole system is high.

Although only a few certain preferred embodiments of the present invention have been shown and described in detail, it should be understood that various changes and modifications may be made therein without departing from the scope of the appended claims.

INDUSTRIAL APPLICABILITY

The present invention is applied to recovering chemical energy of organic matter in the form of a hydrogen gas and converting hydrogen gas to electric energy with high efficiency, and is applicable to a system for producing a hydrogen gas or a hydrogen-containing gas from an anaerobic digestion gas yielded by methane fermentation of organic wastes, and a system for generating electricity by supplying the produced hydrogen gas or hydrogen-containing gas to a fuel cell.

What is claimed is:

1. A fuel cell power generation method utilizing methane fermentation of organic matter, said method comprising:
   a methane fermentation step for subjecting organic matter to methane fermentation to yield a digestion gas;
   a pretreatment step for pretreating the digestion gas yielded in said methane fermentation step;
   a hydrogen production step for producing a hydrogen-containing gas from the pretreated gas in said pretreatment step; and
   a fuel cell power generation step for supplying the hydrogen-containing gas produced in said hydrogen production step to a fuel cell to generate electricity; wherein said pretreatment step comprises an alkaline absorption step for absorbing carbon dioxide or carbon dioxide and hydrogen sulfide contained in the digestion gas yielded in said methane fermentation step into an alkaline absorbent solution to separate carbon dioxide or carbon dioxide and hydrogen sulfide from the digestion gas, wherein, in said alkaline absorption step, the digestion gas is brought into counterflow contact with the alkaline absorbent solution to absorb carbon dioxide or carbon dioxide and hydrogen sulfide into the alkaline absorbent solution to enrich the concentration of methane; and
further comprising:
   a heat exchange step for heating the alkaline absorbent solution which has absorbed carbon dioxide or carbon dioxide and hydrogen sulfide therein in said alkaline absorption step, by waste heat generated in said hydrogen production step and/or said fuel cell power generation step; and
   a regeneration step for regenerating the alkaline absorbent solution by bringing the alkaline absorbent solution heated in said heat exchange step into counterflow contact with a cathode vent gas discharged from said fuel cell power generation step or a combustion exhaust gas discharged from said hydrogen production step to strip carbon dioxide or carbon dioxide and hydrogen sulfide from the alkaline absorbent solution.

2. A method according to claim 1, wherein the temperature of the alkaline absorbent solution prior to regenerating in said regeneration step is lower than the temperature of the outlet of stack cooling water from said fuel cell power generation step by 10° C. or less, while the temperature of the alkaline absorbent solution prior to absorbing in said alkaline absorption step is lower than the temperature of the alkaline absorption solution prior to regenerating in the range of 10° C. to 35° C.

3. A method according to claim 1, wherein the temperature of the alkaline absorbent solution prior to regenerating in said regeneration step is lower than the temperature of the outlet of stack cooling water from said fuel cell power generation step by 2° C. or less, while the temperature of the alkaline absorbent solution prior to absorbing in said alkaline absorption step is lower than the temperature of the alkaline absorption solution prior to regenerating in the range of 10° C. to 35° C. and is higher than the temperature of a methane fermentation liquid in said methane fermentation step by 2° C. or more.

4. A method according to claim 1, wherein a biodesulfurization step is provided and an off-gas discharged from said regeneration step is led to said biodesulfurization step to biodegrade hydrogen sulfide contained in the off-gas.

5. A fuel cell cower generation method utilizing methane fermentation of organic matter, said method comprising:
- a methane fermentation step for subjecting organic matter to methane fermentation to yield a digestion gas;
- a pretreatment step for pretreating the digestion gas yielded in said methane fermentation step;
- a hydrogen production step for producing a hydrogen-containing gas from the pretreated gas in said pretreatment step; and
- a fuel cell cower generation step for supplying the hydrogen-containing gas produced in said hydrogen production step to a fuel cell to generate electricity;
- wherein said pretreatment step comprises an alkaline absorption step for absorbing carbon dioxide or carbon dioxide and hydrogen sulfide contained in the digestion gas yielded in said methane fermentation step into an alkaline absorbent solution to separate carbon dioxide or carbon dioxide and hydrogen sulfide from the digestion gas,
- wherein said alkaline absorption step comprises the step of bringing the gas after the absorption into counterflow contact with water to wash away absorbent solution droplets carried over into the gas.

6. A fuel cell power generation method utilizing methane fermentation of organic matter, said method comprising:
- a methane fermentation step for subjecting organic matter to methane fermentation to yield a digestion gas;
- a pretreatment step for pretreating the digestion gas yielded in said methane fermentation step;
- a hydrogen production step for producing a hydrogen-containing gas from the pretreated gas in said pretreatment step; and
- a fuel cell power generation step for supplying the hydrogen-containing gas produced in said hydrogen production step to a fuel cell to generate electricity;
- wherein said pretreatment step comprises an alkaline absorption step for absorbing carbon dioxide or carbon dioxide and hydrogen sulfide contained in the digestion gas yielded in said methane fermentation step into an alkaline absorbent solution to separate carbon dioxide or carbon dioxide and hydrogen sulfide from the digestion gas, further comprising a desulfurization step wherein the digestion gas yielded in said methane fermentation step is brought into counterflow contact with a desulfurizing solution containing an alkali chemical and a water-soluble oxidizing agent to absorb and oxidatively decompose hydrogen sulfide, and is then supplied to said alkaline absorption step.

7. A fuel cell power generation system in which a digestion gas is yielded by methane fermentation of organic matter, and a hydrogen-containing gas is produced from the yielded digestion gas and then supplied to a fuel cell to generate electricity, said system comprising:
- an alkaline absorption apparatus for absorbing carbon dioxide or carbon dioxide and hydrogen sulfide contained in the digestion gas yielded in the methane fermentation into an alkaline absorbent solution to separate carbon dioxide or carbon dioxide and hydrogen sulfide from the digestion gas for thereby enriching the concentration of methane in the gas, and
- a rinsing apparatus for bringing the gas after the absorption in said alkaline absorption apparatus into counterflow contact with water to wash away absorbent solution droplets carried over into the gas.

8. A fuel cell power generation system in which a digestion gas is yielded by methane fermentation of organic matter, and a hydrogen-containing gas is produced from the yielded digestion gas and then supplied to a fuel cell to generate electricity, said system comprising:
- an alkaline absorption apparatus for absorbing carbon dioxide or carbon dioxide and hydrogen sulfide contained in the digestion gas yielded in the methane fermentation into an alkaline absorbent solution to separate carbon dioxide or carbon dioxide and hydrogen sulfide from the digestion gas for thereby enriching the concentration of methane in the gas, and
- a regeneration apparatus for regenerating the alkaline absorbent solution by bringing the alkaline absorbent solution heated in said heat exchanger into counterflow contact with a cathode vent gas from said fuel cell or a combustion exhaust gas from the production of the hydrogen-containing gas to strip carbon dioxide or carbon dioxide and hydrogen sulfide from the alkaline absorbent solution.

9. A fuel cell power generation system in which a digestion gas is yielded by methane fermentation of organic matter, and a hydrogen-containing gas is produced from the yielded digestion gas and then supplied to a fuel cell to generate electricity, said system comprising:
- an alkaline absorption apparatus for absorbing carbon dioxide or carbon dioxide and hydrogen sulfide contained in the digestion gas yielded in the methane fermentation into an alkaline absorbent solution to separate carbon dioxide or carbon dioxide and hydrogen sulfide from the digestion gas for thereby enriching the concentration of methane in the gas, and
- a heat exchanger for heating the alkaline absorbent solution which has absorbed carbon dioxide or carbon dioxide and hydrogen sulfide therein in said alkaline absorption apparatus, by waste heat generated in the production of the hydrogen-containing gas and/or in the power generation using the hydrogen-containing gas.

10. A system according to claim 9, further comprising:
- a regeneration apparatus for regenerating the alkaline absorbent solution by bringing the alkaline absorbent solution heated in said heat exchanger into counterflow contact with a cathode vent gas from said fuel cell or a combustion exhaust gas from the production of the hydrogen-containing gas to strip carbon dioxide or carbon dioxide and hydrogen sulfide from the alkaline absorbent solution.

11. A system according to claim 10, wherein the temperature of the alkaline absorbent solution prior to regenerating in said alkaline regeneration apparatus is lower than the temperature of the outlet of stack cooling water from said fuel cell using the hydrogen-containing gas by 10° C. or less, while the temperature of the alkaline absorbent solution prior to absorbing in said alkaline absorption apparatus is lower than the temperature of the alkaline absorption solution prior to regenerating in the range of 10° C. to 35° C.

12. A system according to claim 10, wherein the temperature of the alkaline absorbent solution prior to regenerating in said alkaline regeneration apparatus is lower than the temperature of the outlet of stack cooling water from said fuel cell using the hydrogen-containing gas by 2° C. or less, while the temperature of the alkaline absorbent solution prior to absorbing in said alkaline absorption apparatus is lower than the temperature of the alkaline absorption solution prior to regenerating in the range of 10° C. to 35° C. and is higher than the temperature of a methane fermentation liquid in said methane fermentation by 2° C. or more.

* * * * *